Patented July 9, 1929.

1,720,062

UNITED STATES PATENT OFFICE.

FRITZ SEEBACH, OF ERKNER, NEAR BERLIN, GERMANY, ASSIGNOR TO BAKELITE GESELLSCHAFT MIT BESCHRANKTER HAFTUNG, OF BERLIN, GERMANY.

MANUFACTURING PRESS MASSES FROM PHENOLFORMALDEHYDE RESINS.

No Drawing. Application filed February 6, 1926, Serial No. 86,639, and in Germany February 17, 1925.

It has been proposed to make mixtures suitable for the manufacture of articles by means of pressing at ordinary or increased temperature by mixing porous or nonporous filling bodies with phenolformaldehyde condensation products which may be transformed into insoluble and infusible resins by heat or heat and pressure or which preserve their fusibility when heated. The phenolformaldehyde condensation products used for the said purpose were either solid or fluid ready condensed resins. The condensation of phenol and formaldehyde has also been carried out in the presence of filling bodies or porous substances. In the impregnation of porous substances and fibres the condensation products were used as obtained in the course of manufacture and contained the condensation agents used and the by-products formed. The presence of these impurities might be in some cases injurious for instance in the case of electrical insulations. It has also been proposed to manufacture cardboard by mixing fibres or paper paste with compounds of the resins with alkalies and adding diluted acids or solutions of metal salts reacting with the alkali, whereupon the mixture was worked up in the usual way to cardboard. In this process also the by-products obtained from the formation of the resins were precipitated on the fibres and had noxious effects.

The object of the present process is to obviate the objections alluded to. The process consists in preparing a colloidal solution of the phenolformaldehyde resins in alkaline liquids, whereto organic solvents may be added and then mixing or impregnating the filling bodies or porous substances with the said colloidal solutions and effecting a precipitation of the resins by means of water, without decreasing the basic content of the solution. Instead of water, aqueous solutions of substances may be employed which have the property of rendering impurities soluble in water which otherwise are insoluble or difficultly soluble in water. (See Neuberg, Biochemische Zeitschrift, volume 76, page 107, and Sitzungsberichte der Preussischen Akademie der Wissenschaften 1916, page 1034.) Suitable substances which increase the solubility of the impurities in water are for instance sodium salicylate, the soluble salts of the higher fatty acids, especially soaps, as fatty acid soaps, soaps of sulfonated fatty acids, soaps of the natural resinic acids, soaps of the oxyfatty acids, soaps of halogenated fatty acids. The use of substances which increase the solubility of the by-products and impurities in water in the preparation of phenolformaldehyde resins is the object of the patents issued to me as follows:—1,681,-368, Aug. 21, 1928; 1,681,369, Aug. 21, 1928; 1,683,702, Sept. 11, 1928 and 1,697,885, Jan. 1, 1929. Suitable organic solvents are for instance methyl alcohol, benzol, toluol, carbon tetrachloride, ether, acetone or their mixtures.

During the precipitation of the resins according to my invention, other precipitants as acids or such like being absent, only the condensation resins are deposited, the by-products remaining dissolved. The substances which increase the solubility of impurities in water assist in preventing the precipitation of the by-products or other impurities.

The colloidal solutions of the phenolformaldehyde resins may be prepared from the resins by means of the smallest amount possible of water and alkali or substances having alkaline reaction. The amount of water is at most equal to the weight of the resins and the alkali is less than that required for a complete solution of the resins. The preparation of such colloidal solutions is the object of a patent 1,681,369. Colloidal solutions of resins are obtained by mixing soluble and fusible phenolaldehyde resins—preferably by heating them to 30–50° C.—with an equal quantity of water and by adding gradually enough alkali, say 10 to 20 per cent of caustic soda to form an opaque solution of the resin which when diluted with water eliminates the resin. In the present application such solutions are called unstable colloidal solutions. It is not permissible to add too much alkali as otherwise alkaline solutions of resins are obtained which are stable and cannot be precipitated by means of water. The process of producing colloidal solutions may also be carried out by placing the before mentioned quantities of phenolaldehyde resin, water and alkali into a ball mill mixing them therein until a white suspension of resin is formed. Thereafter the ball mill is emptied and the liquid is heated, stirring it continually, until it reaches the opaque stage, or a small quantity, say 10 to 20 percent of alcohol, is added without heating the liquid. During the mixing operation of the colloidal solution of the phenolformaldehyde resins with the filling bodies or porous substances as fibres and such like, partly already a precipitation of the resins may be effected which diminishes the required amount of water in the complete precipitation and facilitates the subsequent handling of and forming of articles from the masses by pressing.

*Example 1.*—100 kilograms of wood meal are mixed with 50 kilograms of a colloidal solution containing 50 percent of phenolformaldehyde resin, capable or not capable of being hardened, the mixing of which may be performed in a kneading machine and which then, preferably under agitation, may be mixed with 50 kilograms of water. The mixture may then be centrifuged and dried, either at ordinary temperature or at gentle heat and may be, either before the drying or afterwards, pressed at heat or at ordinary temperature into various shapes, to form articles.

*Example 2.*—100 kilograms of paper pulp are mixed with 40 kilograms of a colloidal solution containing 35 percent of phenolformaldehyde resin and added to 60 litres of a solution containing 1.5 percent of sodium soap. Such mixture is then treated as described in Example 1.

The process according to my invention may be also carried out by impregnating or mixing the filling bodies or porous substances with sufficient amounts of water in order to precipitate the resins and if desired with substances which increase the solubility of impurities in water, and then adding the colloidal resin solution, which may be added to substances which increase the solubility of impurities in water. The mixing or impregnating may be carried out in all cases under diminished or increased pressure.

The filling substances may be for instance clay, chalk, infusoria earth, sand, glass, asbestos, mica, cotton, wool, wood, saw dust, silk, pumice stone or such like. From these mixtures various articles may be manufactured, such as cigar mouthpieces, pipe bowls, jewels, rings, electrical insulating articles.

I claim:

1. The process for manufacturing press masses from phenolformaldehyde resins and filling bodies which consists in mixing unstable colloidal solutions of phenolformaldehyde resins with filling bodies and precipitating the phenolformaldehyde resins in a pure, finely divided form by means of water without decreasing the basic content of the solution.

2. The process for manufacturing press masses from phenolformaldehyde resins and filling bodies which consists in mixing unstable colloidal solutions of phenolformaldehyde resins with filling bodies and substances which increase the solubility of the impurities in water and precipitating the phenolformaldehyde resins in a pure, finely divided form with water without decreasing the basic content of the solution.

3. The process for manufacturing press masses from phenolformaldehyde resins and filling bodies which consists in mixing unstable colloidal solutions of phenolformaldehyde resins with porous filling bodies and precipitating the phenolformaldehyde resins in a pure, finely divided form by means of water without decreasing the basic content of the solution.

4. The process for manufacturing press masses from phenolformaldehyde resins and filling bodies which consists in mixing unstable colloidal solutions of phenolformaldehyde resins with porous filling bodies and substances which increase the solubility of the impurities in water and precipitating the phenolformaldehyde resins in a pure, finely divided form by means of water without decreasing the basic content of the solution.

In testimony whereof I hereunto affix my signature.

FRITZ SEEBACH.